United States Patent
Vasudev

(10) Patent No.: US 8,731,151 B2
(45) Date of Patent: May 20, 2014

(54) METHODS AND APPARATUS FOR PARTIALLY UPDATING A WEB PAGE USING AN EMBEDDED IFRAME

(75) Inventor: Gautam Vasudev, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/604,356

(22) Filed: Sep. 5, 2012

(65) Prior Publication Data

US 2013/0202098 A1   Aug. 8, 2013

Related U.S. Application Data

(60) Provisional application No. 61/594,209, filed on Feb. 2, 2012.

(51) Int. Cl.
*H04M 11/00* (2006.01)

(52) U.S. Cl.
USPC .............. 379/93.17; 379/265.01; 379/265.02; 379/265.09; 709/204; 719/313

(58) Field of Classification Search
USPC .............................. 379/93.17, 265.01–266.01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |

(Continued)

OTHER PUBLICATIONS

Final Office Action for U.S. Appl. No. 12/437,418, mailed Apr. 16, 2012.

(Continued)

*Primary Examiner* — Joseph J Nguyen
(74) *Attorney, Agent, or Firm* — Ingrassia Fisher & Lorenz, P.C.

(57) ABSTRACT

Methods and systems are provided for managing customer service calls using a localhost service operating within a desktop environment. The system includes a web-based application configured to display browser windows including an overlayed or embedded softphone component, and a desk top application which serves a telephony application configured to receive call status information from a CTI adapter. The softphone is supported by an iFrame which exchanges call status information with the desk top application.

14 Claims, 5 Drawing Sheets

(56) References Cited

U.S. PATENT DOCUMENTS

| | | | |
|---|---|---|---|
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,100,111 | B2 | 8/2006 | McElfresh et al. |
| 7,269,590 | B2 | 9/2007 | Hull et al. |
| 7,340,411 | B2 | 3/2008 | Cook |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,454,509 | B2 | 11/2008 | Boulter et al. |
| 7,599,935 | B2 | 10/2009 | La Rotonda et al. |
| 7,603,331 | B2 | 10/2009 | Tuzhilin et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,747,648 | B1 | 6/2010 | Kraft et al. |
| 7,827,208 | B2 | 11/2010 | Bosworth et al. |
| 7,853,881 | B1 | 12/2010 | Aly Assal et al. |
| 7,856,445 | B2 | 12/2010 | Gross |
| 7,945,653 | B2 | 5/2011 | Zuckerberg et al. |
| 7,991,764 | B2 | 8/2011 | Rathod |
| 8,005,896 | B2 | 8/2011 | Cheah |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,166,013 | B2 | 4/2012 | Bandaru et al. |
| 8,275,836 | B2 | 9/2012 | Beaven et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0023859 | A1* | 2/2006 | Crockett et al. ......... 379/212.01 |
| 2007/0185957 | A1* | 8/2007 | Mandalia et al. ............. 709/204 |
| 2008/0010270 | A1 | 1/2008 | Gross |
| 2008/0147487 | A1 | 6/2008 | Hirshberg |
| 2008/0205624 | A1* | 8/2008 | Mandalia et al. ........ 379/265.02 |
| 2008/0209320 | A1 | 8/2008 | Mawhinney et al. |
| 2010/0125502 | A1 | 5/2010 | Solomon et al. |
| 2010/0162153 | A1* | 6/2010 | Lau .............................. 715/769 |
| 2010/0217757 | A1 | 8/2010 | Fujioka |
| 2010/0241576 | A1 | 9/2010 | Beeri |
| 2010/0246800 | A1* | 9/2010 | Geppert et al. .......... 379/265.09 |
| 2011/0209067 | A1 | 8/2011 | Bogess et al. |
| 2011/0258204 | A1 | 10/2011 | Hubbard et al. |
| 2012/0047517 | A1* | 2/2012 | Townsend et al. ............ 719/313 |
| 2012/0290407 | A1 | 11/2012 | Hubbard et al. |

OTHER PUBLICATIONS

Final Office Action for U.S. Appl. No. 12/356,429, mailed May 2, 2012.

Notice of Allowance for U.S. Appl. No. 12/819,402, mailed May 14, 2012.

Non-Final Office Action for U.S. Appl. No. 13/453,802, mailed Jun. 8, 2012.

Linear Combination—Wikipedia (http://en.wikipedia.org/wiki/Linear_Combination (accessed Jul. 16, 2012).

* cited by examiner

FIG. 3

METHODS AND APPARATUS FOR PARTIALLY UPDATING A WEB PAGE USING AN EMBEDDED IFRAME

CROSS-REFERENCE TO RELATED APPLICATION

This application claims the benefit of U.S. provisional patent application Ser. No. 61/594,209, filed Feb. 2, 2012, the entire content of which is incorporated by reference herein.

TECHNICAL FIELD

Embodiments of the subject matter described herein relate generally to computer systems and applications for customer relationship management and, more particularly, to a communications architecture for securely updating a web-based user interface with telephony information using an embedded iFrame.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Robust customer relationship management (CRM) systems and applications have been developed for use in the multi-tenant environment. Presently known CRM applications typically include a web-based component and a telephony component. The web-based component presents a customer service representative (CSR) with a dash board-style user interface which summarizes information pertaining to an incoming call, such as the caller's name, title, company affiliation, location, nature and priority of the customer service inquiry, incident history, and the like.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a web page screen shot of an exemplary softphone window supported by a hidden iFrame in accordance with one or more embodiments;

DETAILED DESCRIPTION

Embodiments of the subject matter described herein generally relate to a computer telephony integration (CTI) application for use with a customer relationship management (CRM) system in the context of a multitenant computing environment.

Figure 1:
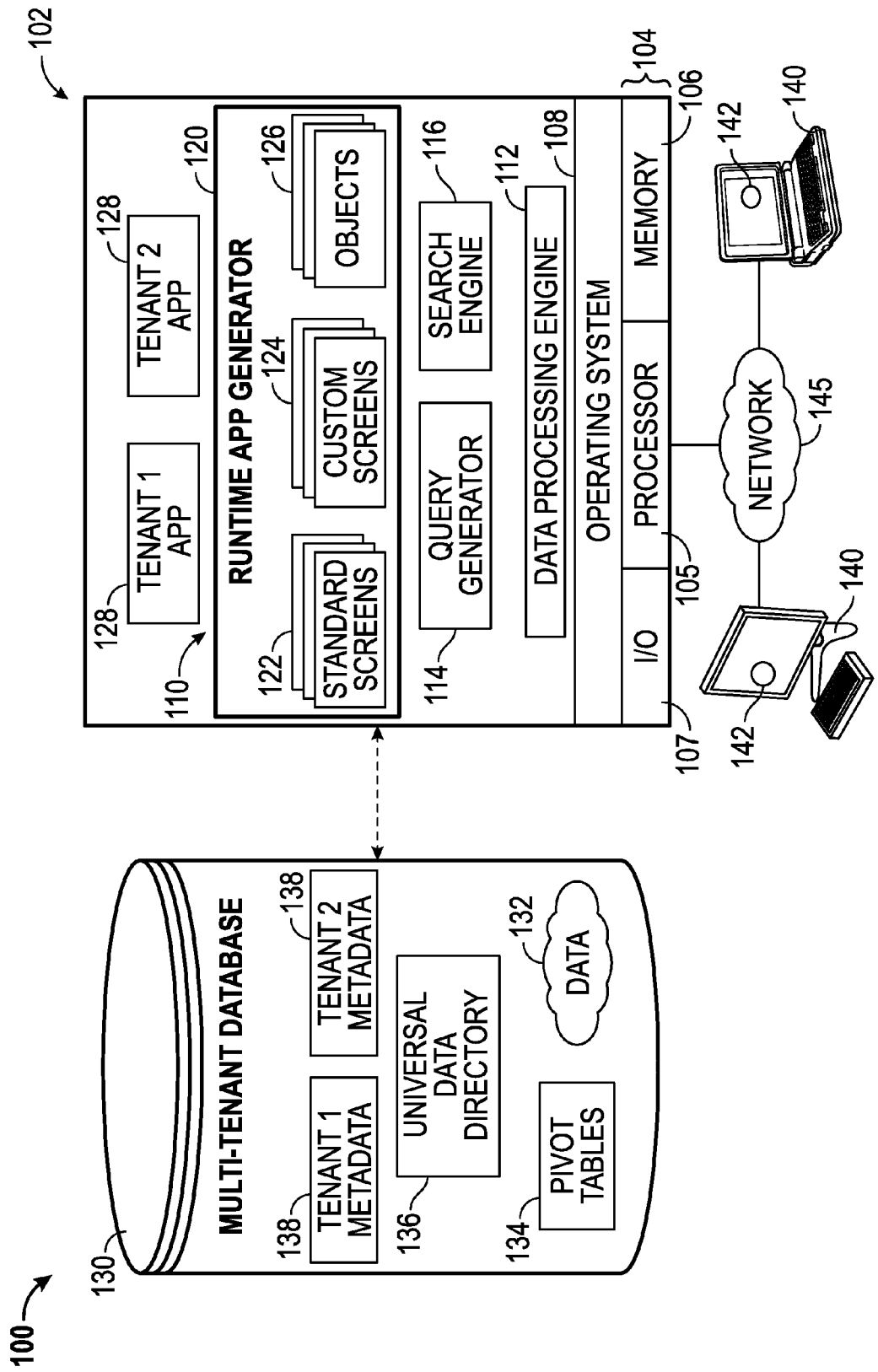
FIG. 1 is a schematic block diagram of an exemplary multi-tenant computing environment

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multitenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In accordance with one embodiment, application 128 may be a customer relationship management (CRM) system of the type which includes a computer telephony integration (CTI) application, often referred to as a "softphone". A typical CRM architecture includes an interactive web application and a CTI module which work together to create a seamless browser experience including softphone component. The web application includes a dash board interface for presenting aggregate customer information to a customer service representative (CSR), and for managing incoming customer service calls; the CTI module communicates with the telephony hardware and renders the "softphone" inside the browser window.

Presently known CTI modules are designed to route an incoming call to a CSR by inserting (e.g., overlaying) an interactive softphone window into the web page being viewed by the CSR. When an incoming customer service call is received, the softphone displays a graphical, textual, or numeric icon to alert the CSR to answer the call. The CSR may then 'click' on the softphone graphic to answer and service the call. In one such system, the CTI component employs Microsoft's ShellDocView utility to select a browser page from an Internet Explorer™ compliant library, and to insert hyper-text transfer protocol language (HTML) and associated functionality directly into the browser page along with a softphone graphic (e.g., a softphone window) into the IE browser session served up by the web application.

This approach is advantageous in that it has no network delay; however, it presents a security vulnerability to the extent it injects HTML directly into the web page. Moreover, the ShellDocView library is limited in that it is designed to be used only with the Internet Explorer browser.

In accordance with one embodiment of the present disclosure, a localhost model is employed, meaning that all communication between the CTI application and the web application is local to the CSR desktop. That is, while the CRM application executes on the network cloud, the desktop does not need to reach out over the Internet or to a local intranet to facilitate communication between the telephony application and the browser windows served up by the web application. In this context, the term "desktop" means the local computer used by the CRS to service the customer service call, and can include a traditional desktop computer, laptop, notebook, hand-held, or any other type of computing device which presents a web based CRM application to the CSR and which includes a telephony component for refreshing the softphone in the context of the browser experience.

Figure 2:
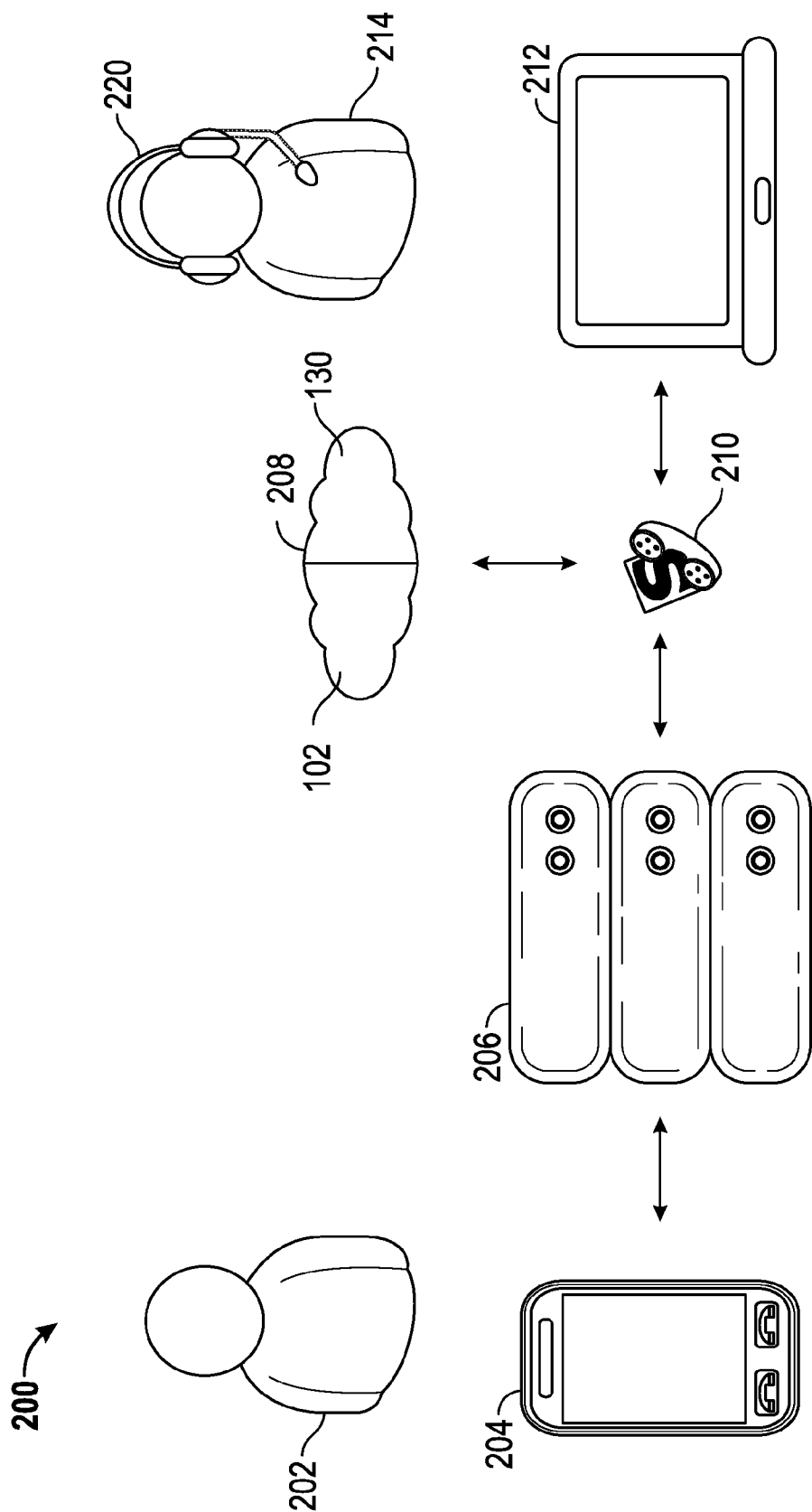
FIG. 2 is a schematic block diagram of an exemplary architecture for integrating a telephony application into a customer relationship management (CRM) system.

Referring now to FIG. 2, an exemplary customer relationship management system 200 includes a computer telephony integration executable (CTI.exe) module 206, a web-based softphone application 210, a computing cloud 208 which includes server 102 and database 130, and a customer service representative (CSR) 214 equipped with a telephony headset 220 and a CSR desktop computer monitor 212. A customer 202 places a customer service call using a customer telephone 204, and is routed to CSR 214 as described below.

CTI.exe 206 is configured to run locally on the CSR desktop, and to serve both the telephony application which interfaces with customer telephone 204, as well as the softphone component 210 which is integrated into the user interface presented to the CSR 214 via monitor 212. In particular, CTI.exe 206 is configured to communicate with the iFrame which supports the softphone component 210 within the web page served by cloud 208.

Figure 3:
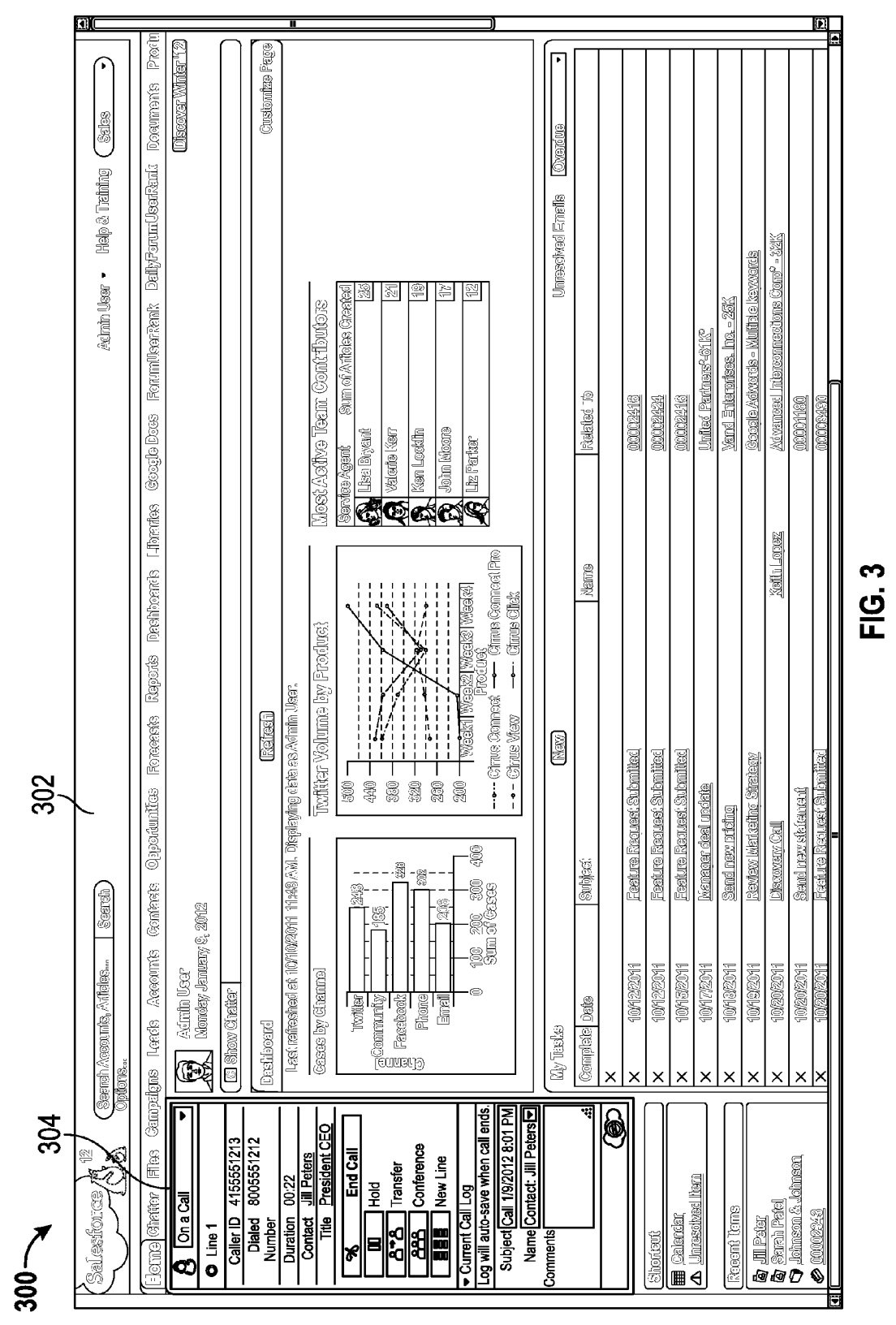

FIG. 3 illustrates an exemplary graphical user interface 300 including a softphone graphic 304 such as an iFrame-supported window which is embedded, overlayed, superimposed, or otherwise presented within a web page 302, for example, a dash board style summary of customer information relating to customer service calls.

Figure 4:
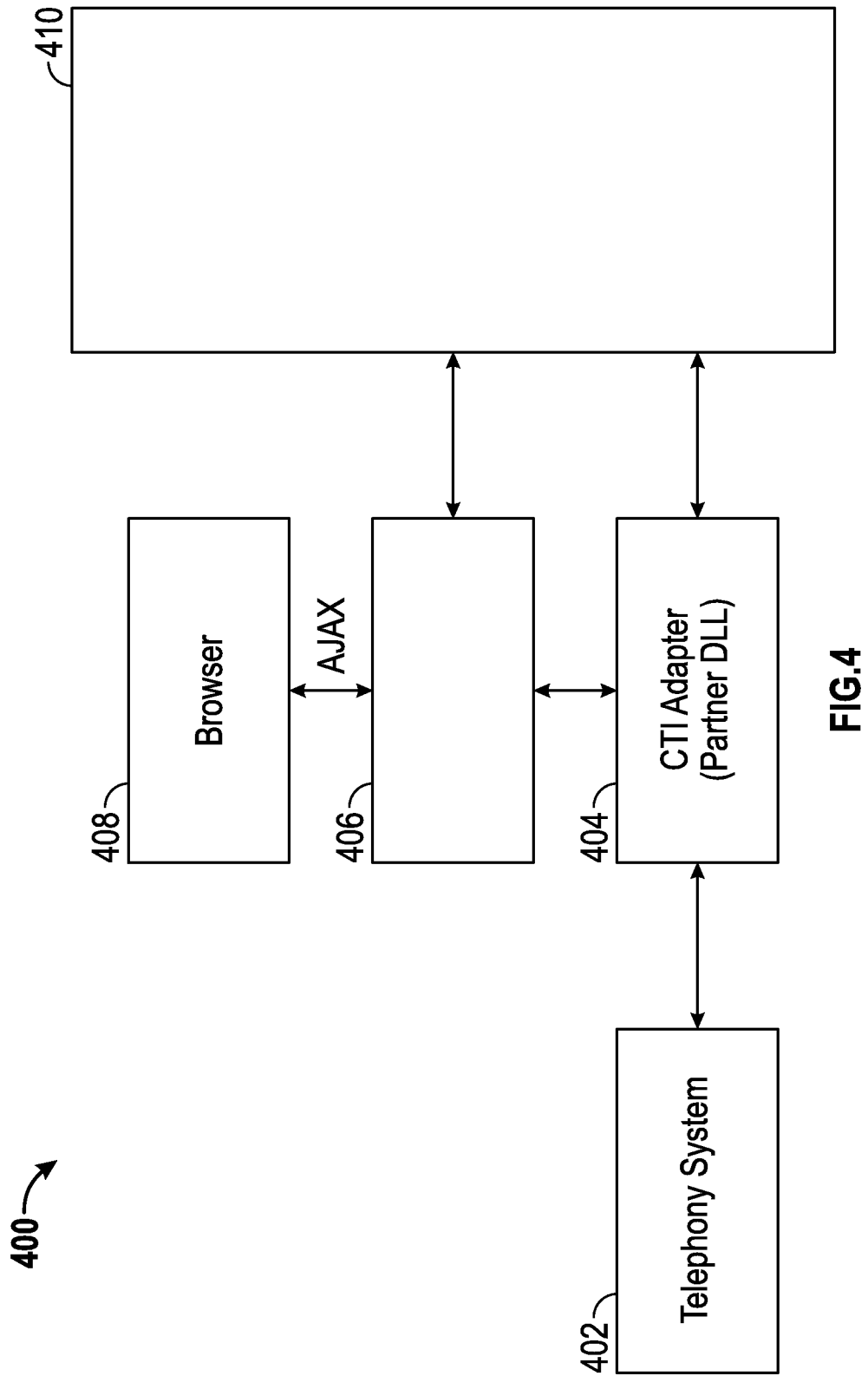
FIG. 4 is a schematic block diagram of an exemplary computer telephony integration (CTI) application for use with a CRM system.

FIG. 4 is a logical block diagram of a CTI.exe module 406 which interfaces with a telephony system 402 using, for example, a CTI adapter library 404. CTI.exe 406 is also configured to communicate with a web-based CRM application, for example, a browser application 408. As explained in greater detail below, CTI.exe 406 is configured to pass updated call status information to browser 408 and facilitate the integration of the updated call status information with customer information from a customer database 410.

Telephony system 402 may be in the form of an enterprise platform, a midmarket platform, an on-demand platform, a system integrator platform, or a combination or hybrid of the foregoing. Presently known enterprise platform providers include Avaya™, Cisco™, Genesys™, Aspect™, Siemens™, Nortel™, Alcatel™, Rockwell™, and NEC™. Presently known midmarket platform providers include ShoreTel™, Interactive Intelligence™, Ericsson™, Linksys™, Vertical™, 3Com™, Asterisk™, and Mitel™. Presently known on-demand providers include Liveops™, inContact™, Contactual™, Five9™, Echopass™, Teamphone™, Angel.com™, and Skype™. Presently known system integrators include Syntellect™, SimpliCTI™, AMC Technology™, BCE Elix™, and ilink™.

In an embodiment, adapter library 404 includes an adapter for each possible provider of telephony platform 402. In this way, CTI.exe 406 may operate seamlessly with any one of a plurality of telephony systems in a manner which is transparent to the caller 202 and the CSR 214. That is, by selecting the appropriate adapter from the adapter library, the look and feel of the browser experience from the perspective of the CSR is consistent across a range of telephony providers.

With continued reference to FIG. 4, CTI.exe 406 may be agnostic to the browser; that is, the look and feel of the CRM application browser experience may also be consistent across a range of browsers such as, for example, Internet Explorer™ (IE8+), Chrome™, Opera™, Firefox™, and Safari™ (to the extent they support HTML5 post message functionality). To accomplish this, various embodiments of the desktop application utilize asynchronous Javascript and XML (Ajax) messaging protocols to embed the softphone graphic via an iFrame into the web page.

Figure 5:
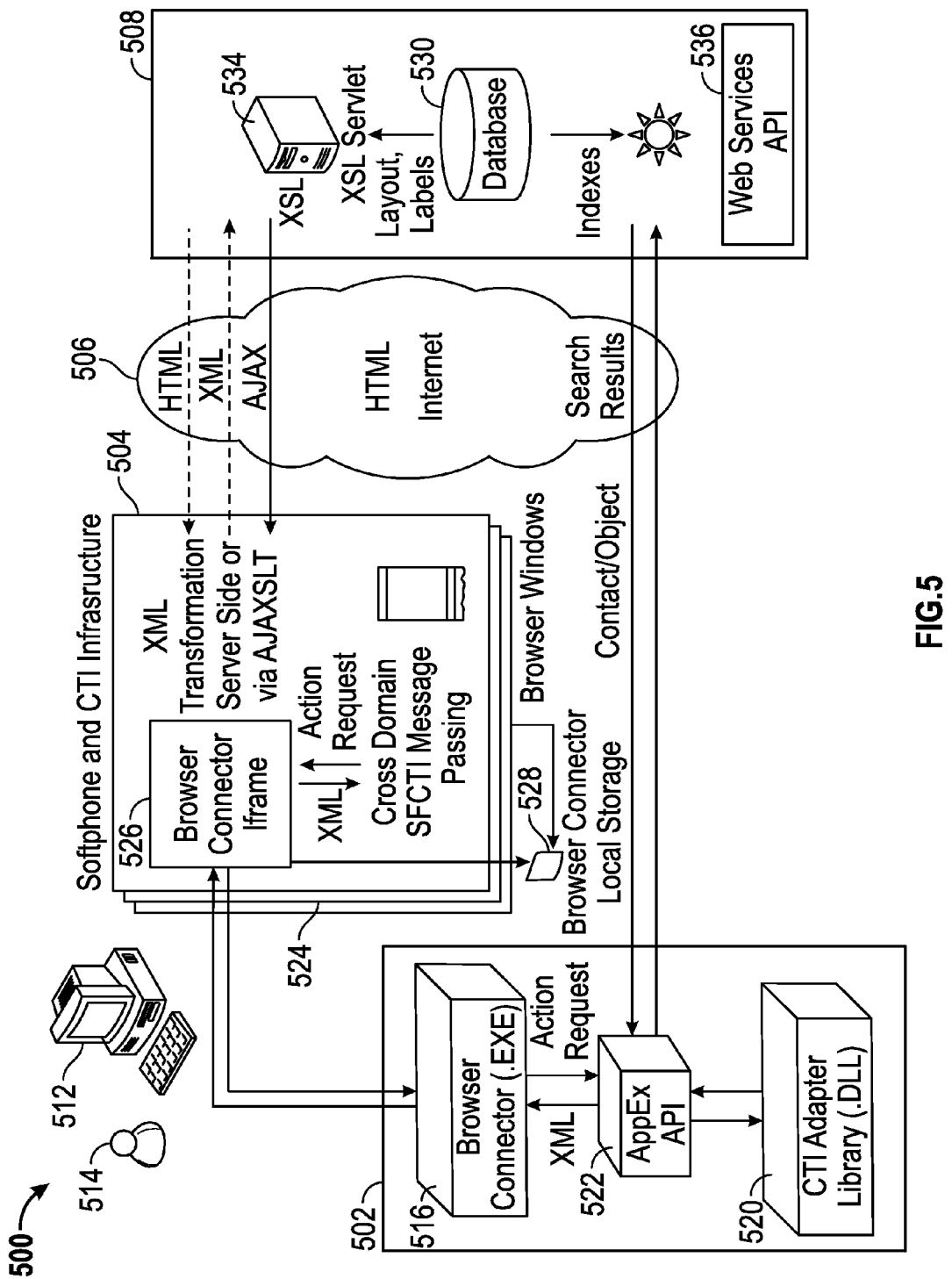
FIG. 5 is a schematic block diagram illustrating various details of the softphone and computer telephony integration (CTI) infrastructure associated with the CRM desktop application shown in FIG. 3.

Turning now to FIG. 5, an embodiment of a customer relationship management (CRM) architecture 500 includes a telephony module 502, a softphone and CTI infrastructure module 504, an Internet connectivity cloud 506, and a data service module 508. Data service module 508 may include a web services application programming interface (API) 536 to facilitate web-based communication with telephony module 502, an aggregate customer database 530, and a data server 534.

Telephony module 502 includes a CTI adapter library 520, a telephony API 522 for communicating with data module 508 through cloud 506, and a browser connector module 516. Browser connector module 516 is configured to exchange Ajax messages with softphone/CTI module 504 to communicate with the iFrame which supports the softphone window in the web page, as described in greater detail below.

With continued reference to FIG. 5, softphone/CTI infrastructure module 504 includes a browser connector local storage 528 which serves a plurality of browser compliant web pages 524, and a browser connector iFrame which uses Ajax protocols or equivalent technology to insert a softphone graphic in the form of an iFrame into the web page as needed (for example, to alert the CSR of an incoming call). Softphone/CTI infrastructure module 504 further uses XML for exchanging customer information with data service module 508 via cloud 506.

Softphone/CTI infrastructure module 504 is implemented as a localhost service and is thus capable of implementing the functions associated with CTI.exe 206 in a desktop environment. That is, module 504 retrieves incoming call information and displays the call in an iFrame within a web page, without having to reach out beyond the desktop. This reduces or eliminates the network delay associated with most implementations by using cross domain communication, allowing real time interaction of both the telephony system and the web application within a seamless browser experience.

A computer telephony integration (CTI) application for managing customer service calls on a desktop computer is provided. The application includes a first module which serves a web-based application configured to communicate call status information to a browser window, and a second module which serves a telephony application configured to receive call status information from a CTI adapter, wherein the first and second modules may be implemented as a single, integrated code base stored in a non-transitory computer readable storage medium for execution by the desktop computer.

The first module may be configured to operate in a network domain, and the second module may be configured to operate in a desk top domain. Communication between the first and second domains is substantially or wholly local to the desktop computer, i.e., the application does not need to access the Internet or a local intranet to facilitate interaction between the web application and the telephony application. For example, the softphone may function as a pop-up window within the web-based application operating in the first domain, whereas the second module implements the functions of a browser connector for the telephony application in the second domain.

In one embodiment of the CTI application, the browser connector is configured to establish communication with an iFrame which supports a softphone window embedded in the browser. In this way, both the softphone window (which is observable by the user) and the hidden iFrame which supports the softphone may be refreshed (updated) to reflect a change in call status, for example, by using a JavaScript message such as an asynchronous JavaScript and XML (Ajax) protocol.

Upon a change in the status of a customer service call, such as the receipt or termination of an incoming call, the CTI adapter is configured to pass a call status message to the browser connector, and the browser connector is configured to update the iFrame to reflect the status change. For example, the iFrame may be updated to notify the customer service representative that an incoming call has been received, to thereby prompt the customer service representative to answer the call.

A customer relationship management (CRM) system for use with a desktop computer is also provided. The system includes an adapter library having a plurality of computer telephony integration (CTI) adapters for a plurality of telephony service providers; a browser connector configured to exchange call messages with one of the adapters; local storage stored within a plurality of CRM browser windows; and a web application configured to display the browser windows and to communicate with the browser connector. As a practical matter, only one adapter is typically used at one time, inasmuch as a particular call service center would likely use a single telephony service provider; hence, it is appropriate for the telephony providers to develop their own individual adapters to work in conjunction with published CTI specifications.

In an embodiment, the adapter(s) and the CTI application comprise a single, integrated code base stored on and executable by the desktop computer. The web application is suitably served by a computing cloud on a network, and is configured to present a customer service representative (CSR) with a user interface (e.g., a dash board-style graphical user interface (GUI)) which summarizes information pertaining to customer service calls. The information may include one or more of the following: the caller's name, title, company affiliation, location, nature and priority of the customer service inquiry, and the incident history.

Communication between the web application and the browser connector may be controlled by a single, integrated set of computer executable instructions residing on and executed by the desktop computer. In this way, communication between the browser connector and the web application may be primarily (or exclusively) local to the desktop computer. Thus, for example, upon a change in the status of a customer service call, the browser connector may update the iFrame to reflect the status change without having to access the Internet (or intranet).

Also provided is a method of partially refreshing a user interface associated with a computer telephony integration (CTI) application running on a desktop computer, the method including serving, from a network cloud, a web-based application configured to present a softphone to a user on a computer display (monitor); serving, from the desk top computer, a telephony application configured to exchange customer service call information with a CTI adapter; and passing call status information from the CTI application to the softphone using an embedded iFrame. The method further includes refreshing the iFrame upon a change of said call status information.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer telephony integration (CTI) application for managing customer service calls on a desktop computer, comprising:
 a first module serving a web-based application configured to present a user with a browser window having an embedded softphone, wherein said first module is configured to operate in a first domain comprising an on-demand network computing platform; and
 a second module serving a telephony application configured to receive call status information from a CTI adapter and forward said call status information to said softphone, wherein said second module is configured to operate in a second domain comprising a desktop environment;
 wherein communication between said first and said second domains is local to said desktop computer; and
 wherein said first and second modules comprise an integrated code base stored in a non-transitory computer readable storage medium in said desktop environment.

2. The CTI application of claim 1, wherein said softphone is configured as a pop-up window.

3. The CTI application of claim 1, wherein said second module functions as a browser connector for said telephony application.

4. The CTI application of claim 3, wherein said web application includes an iFrame for supporting said softphone, and said browser connector is configured to communicate with said iFrame.

5. The CTI application of claim 4, wherein said browser connector is configured to pass call status information to said softpohne using said iFrame.

6. The CTI application of claim 4, wherein said browser connector is configured to update said iFrame to reflect an incoming customer service call using a JavaScript message.

7. The CTI application of claim 4, wherein said Javascript message is an asynchronous JavaScript and XML (Ajax) protocol compliant message.

8. The CTI application of claim 4 wherein, upon receipt of an incoming customer service call:
   said adapter is configured to pass an incoming call message to said browser connector;
   said browser connector is configured to update said iFrame to reflect said incoming call; and
   said iFrame is configured to update said softphone to reflect said incoming call.

9. A customer relationship management system for use with a desktop computer, comprising:
   a computer telephony integration (CTI) adapter;
   a browser connector configured to exchange call messages with said adapter;
   a plurality of CRM browser windows; and
   a web application configured to display said CRM browser windows and to communicate with said browser connector;
   wherein said browser connector is stored on and executable by said desktop computer;
   wherein said browser connector comprises an integrated set of computer executable instructions residing on and executable by said desktop computer; and
   wherein communication between said browser connector and said web application is local to said desktop computer.

10. The customer relationship management system of claim 9, wherein said browser connector is configured to communicate with an embedded iFrame in at least one of said CRM browser windows.

11. The customer relationship management system of claim 10, wherein said communication is implemented using asynchronous JavaScript and XML (Ajax) protocols.

12. The customer relationship management system of claim 9, wherein said web application is configured to present a customer service representative (CSR) with a user interface which summarizes information pertaining to customer service calls.

13. The customer relationship management system of claim 12, wherein said information includes at least one of the following: the caller's name, title, company affiliation, location, nature and priority of the customer service inquiry, and incident history.

14. The customer relationship management system of claim 9 wherein, upon a change in status of a customer service call, said browser connector is configured to update said iFrame to reflect said status change.

* * * * *